(12) United States Patent
Noh et al.

(10) Patent No.: US 7,836,218 B2
(45) Date of Patent: Nov. 16, 2010

(54) SYSTEM AND METHOD FOR RECOGNIZING EXTERNAL DEVICE BY PORTABLE TERMINAL

(75) Inventors: Dong-Hoon Noh, Gumi-si (KR); Moon-Sung Choi, Gyeongsangbuk-do (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 136 days.

(21) Appl. No.: 12/043,334

(22) Filed: Mar. 6, 2008

(65) Prior Publication Data

US 2008/0263234 A1    Oct. 23, 2008

(30) Foreign Application Priority Data

Apr. 23, 2007   (KR) ............... 10-2007-0039556

(51) Int. Cl.
*G06F 3/00* (2006.01)
(52) U.S. Cl. ........................... 710/15; 710/16
(58) Field of Classification Search ............... None
See application file for complete search history.

(56) References Cited

U.S. PATENT DOCUMENTS 6,087,803 A * 7/2000 Eguchi et al. ............... 320/106
6,510,524 B1 * 1/2003 Osborn et al. ............... 713/323
2002/0169913 A1 * 11/2002 Heizer et al. ................ 710/302
2007/0226381 A1 * 9/2007 Kuan et al. .................. 710/16

FOREIGN PATENT DOCUMENTS

KR    10-0671503    1/2007

* cited by examiner

*Primary Examiner*—Eron J Sorrell
(74) *Attorney, Agent, or Firm*—Cha & Reiter, LLC

(57) ABSTRACT

Disclosed are a system, a method and device for recognizing an external device by a portable terminal. The external device determines whether the external device has recognized the portable terminal according to signals with a predetermined form, which have been output from the portable terminal regardless of the on/off state of the power source thereof, and outputs signals for a predetermined period of time according to a result of the determination. Thereafter, the portable terminal recognizes the external device according to the number or the form of signals input from the external device through a recognition node for a predetermined period of time. As a result, the portable terminal can recognize more various external devices, such as an external battery and a charging cradle which provides stereo sound, by using the recognition node of the portable terminal.

13 Claims, 2 Drawing Sheets

SYSTEM AND METHOD FOR RECOGNIZING EXTERNAL DEVICE BY PORTABLE TERMINAL

CLAIM OF PRIORITY

This application claims the benefit of the earlier filing date, under 35 U.S.C. §119(a), to that patent application entitled "System and Method for Recognizing External Device by Portable Terminal," filed in the Korean Intellectual Property Office on Apr. 23, 2007 and assigned Serial No. 2007-39556, the contents of which are hereby incorporated by reference.

BACKGROUND OF THE INVENTION

1. Field of the Invention

The present invention relates to portable terminals, and more particularly, a system and a method for recognizing an external device by a portable terminal.

2. Description of the Related Art

In general, a portable terminal refers to a device that can store various information, process and output stored information while being carried by a user, and may provide a mobile communication function to a user. Such a portable terminal includes a Personal Digital Assistant (PDA), a Global Positioning System (GPS) terminal, a mobile communication terminal, etc. As notebook computers have recently been miniaturized, the portability of notebook computers has been further improved. At the same time, with the development of wireless communication technologies, an environment has been created where a user can use multimedia functions, such as watching a movie, or access the Internet regardless of time and place while carrying a notebook computer.

Recently, various functions have been added to portable terminals in order to meet diverse demands of users. Specifically, currently popular multimedia functions (e.g. data and image delivery) as well as functions (e.g. e-mail, the Internet, games, etc.) performed by using portable terminals are being continually added to the portable terminals.

Also, external devices, such as an external camera, an external flash, an MP3 player, etc., may be connected to a portable terminal for use of each corresponding function.

When a plug of a corresponding external device is inserted into such a portable terminal, the portable terminal detects the presence of the external device, and supports the performance of the external device's function according to a result of the detection.

However, portable terminals and external devices use different plugs depending on manufacturers and types of products, so that the unit cost of production increases. Accordingly, need of a portable terminal capable of recognizing various external devices is increasing.

SUMMARY OF THE INVENTION

The present invention provides a system, a method and device for recognizing an external device by a portable terminal, by which an external device can recognize a portable terminal regardless of the on/off state of the portable terminal, and the portable terminal can recognize various external devices through a recognition node.

In accordance with an aspect of the present invention, there is provided a system for recognizing an external device by a portable terminal, the system including the external device for outputting signals for a predetermined period of time according to whether the external device recognizes a portable terminal and the portable terminal for recognizing the external device according to signals input from the external device for a predetermined period of time.

In accordance with another aspect of the present invention, there is provided a method for recognizing an external device by a portable terminal, the method including the steps of outputting, by the portable terminal, signals while maintaining the signals at a predetermined form, regardless of an on/off state of a power source, connecting the portable terminal with the external device, determining, by the external device, whether the external device recognizes the portable terminal according to the signals with the predetermined form, output from the portable terminal, recognizing, by the external device, the portable terminal when the signals output by the portable terminal have the predetermined form, and outputting signals for a predetermined period of time; and recognizing, by the portable terminal, the external device according to a number or form of signals, input from the external device through a recognition node for a predetermined period of time.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention are described with reference to the accompanying drawings. For the purposes of clarity and simplicity, a detailed description of known functions and configurations incorporated herein will be omitted as such known functions may make the subject matter of the present invention unclear.

Figure 1A:
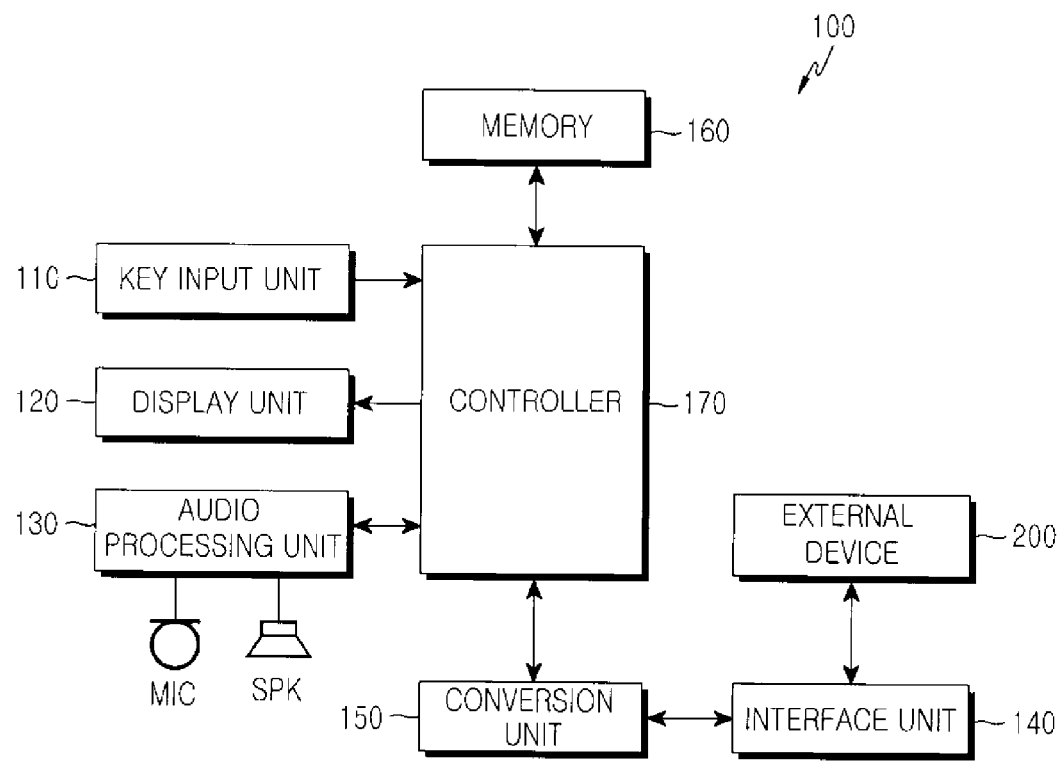
FIG. 1A is a block diagram showing the construction of a system for recognizing an external device according to an exemplary embodiment of the present invention.
Figure 1B:
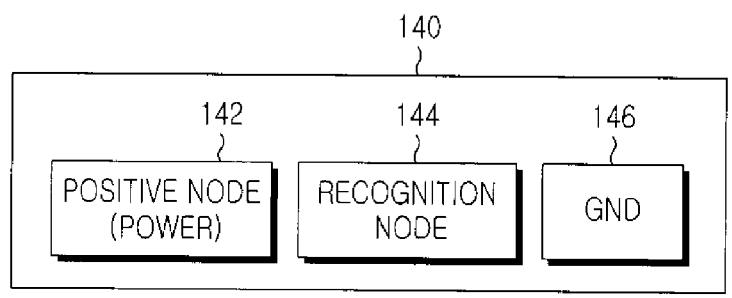
FIG. 1B is a block diagram showing the construction of an interface unit in a portable terminal according to an exemplary embodiment of the present invention.

FIG. 1A is a block diagram showing the construction of a system for recognizing an external device according to an exemplary embodiment of the present invention, and FIG. 1B is a block diagram showing the construction of an interface unit in a portable terminal according to an exemplary embodiment of the present invention.

Referring to FIG. 1A, the portable terminal 100 includes a key input unit 110, a display unit 120, an audio processing unit 130, an interface unit 140, a conversion unit 150, a memory 160, and a controller 170.

The key input unit 110 includes character keys, numeral keys, a variety of function keys, and an external volume key, and outputs key input signals corresponding to keys pressed by the user to the controller 170.

The display unit 120 may include a Liquid Crystal Display (LCD) or other similar display type device (e.g., LED, CRT, plasma), and outputs various display data generated by the portable terminal 100. When the LCD is implemented in a touch screen scheme, the display unit 120 may operate as an input unit.

The audio processing unit 130 modulates electrical signals input from a microphone to convert the modulated signals into voice data, and the audio processing unit 130 demodulates encoded voice data input from a radio transmission/ reception unit (not shown) into electrical signals to output the electrical signals to a speaker.

Preferably, the audio processing unit 130 includes a codec, which converts digital audio signals received from the radio transmission/reception unit (not shown) into analog signals for reproduction, and converts analog audio signals generated from a microphone into digital audio signals. The codec includes a data codec for processing packet data, etc., and an audio codec for processing audio signals, such as voice, and may be separately provided or included in the controller 170.

The interface unit 140 includes a recognition node 144, which is to be connected to an external device 200 so as to recognize the external device 200, and includes a positive node 142 and a ground node 146 for supplying power to each component of the portable terminal 100. In addition, the recognition node 144 is connected with a node corresponding to the external device 200 and delivers signals, input from the external device 200 for a predetermined period of time, to the conversion unit 150.

Meanwhile, the recognition node 144 is used as a pin through which the controller 170 outputs a signal with a constant form (e.g., high level) regardless of the on/off state of a power source and through which the external device 200 recognizes the portable terminal 100.

The conversion unit 150 converts signals transferred from the recognition node 144 into digital signals, and then transfers the converted digital signals to the controller 170.

The memory 160 may include a Read Only Memory (ROM), a Random Access Memory (RAM), a Flash RAM, or other storage component or device. The ROM stores reference data and micro-codes of programs for the processing and controlling operations of the controller 170.

Specifically, operation programs executed for detection and display of information about a state of a battery and a remaining amount of the battery according to the present invention are encoded and stored in the ROM. The RAM serves as a working memory of the controller 170 and stores temporary data generated during the execution of various programs. The flash memory stores various updatable storage data, such as a phone book.

According to an exemplary embodiment of the present invention, the memory 160 stores a table regarding types of externals device 200 corresponding to digital signals converted by the conversion unit 150.

The controller 170 controls the general operation of the portable terminal 100 according to the embodiment of the present invention. Also, the controller 170 identifies the number of digital signals (rising edges/falling edges) or the forms of digital signals, which have been input through the recognition node 144 of the interface unit 140 from the external device 200 for a predetermined period of time and have been converted, and determines whether or not to be connected with the external device 200 and recognizes the type of the external device 200.

A case where the controller 170 recognizes the external device 200 will now be described as an example. When digital signals, which have been input from the external device 200 and has been converted by the conversion unit 150, include only one falling edge, the controller 170 recognizes that the portable terminal 100 has been connected with an external battery. Thereafter, the external battery supplies charging power to the portable terminal 100 through external battery's nodes corresponding to the positive node 142 and ground node 146 of the portable terminal 100, thereby performing the same function as a battery extension pack.

Meanwhile, the controller 170 checks the voltage of the external battery, calculates a charged state and an expected available time, and then outputs the resultant data. In this case, the controller 170 may output the charged state and the expected available time by means of at least one of a voice message and a text message.

In addition, a case where the controller 170 recognizes a charging cradle which provides stereo sound will now be described as an example. When digital signals, which have been input from the external device 200 and has been converted by the conversion unit 150, include one rising edge and one falling edge, the controller 170 recognizes that the portable terminal 100 has been connected with the charging cradle. In this case, the charging cradle converts the voice of a communication partner connected with the portable terminal 100 or data associated with various data (e.g., moving pictures) of the portable terminal 100 into audio signals for reproduction, and then outputs the audio signals via a speaker.

The external device 200 outputs a signal with a specific form of a unique level according to the type of the external device 200. The external device 200 is connected with the portable terminal 100 through a node of the external device 200 corresponding to the interface unit 140 of the portable terminal 100, and then determines whether the external device 200 has recognized the portable terminal 100 according to a signal with a predetermined form (e.g. high level) output from the recognition node 144 of the portable terminal 100.

When a signal output from the recognition node 144 of the portable terminal 100 does not have a high level, the external device 200 fails to recognize the portable terminal 100. In this case, the external device 200 displays a state of being detached from the portable terminal 100 on the display unit (not shown), and re-determines if the external device 200 is connected with the portable terminal 100. In contrast, when a signal output from the recognition node 144 of the portable terminal 100 has a high level, the external device 200 recognizes the portable terminal 100 and outputs a signal for a predetermined period of time.

The operation and effects of the system having the aforementioned construction according to the embodiment of the present invention will now be described.

Figure 2:
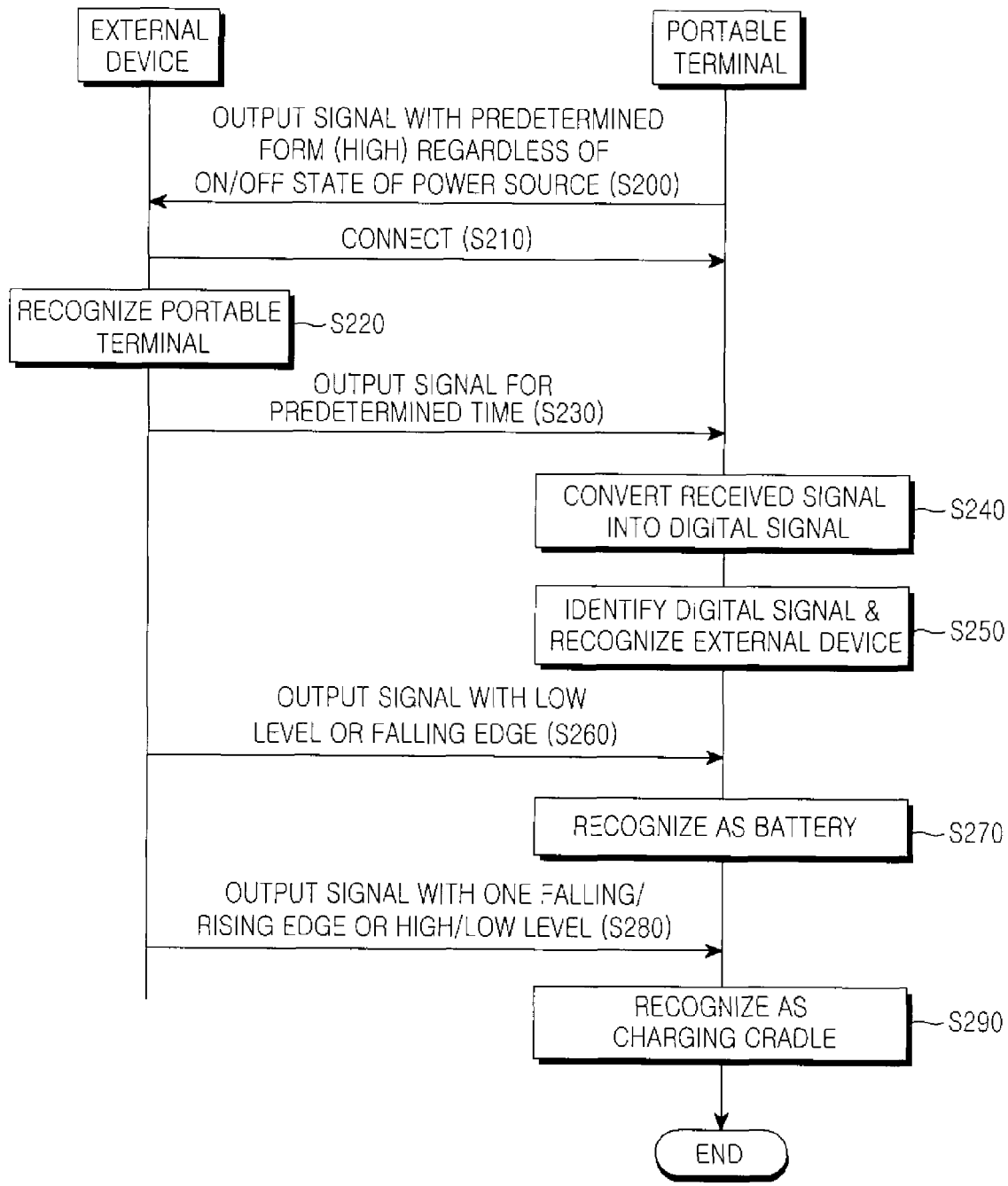
FIG. 2 is a flow diagram showing a method for recognizing an external device by a portable terminal according to an exemplary embodiment of the present invention.

FIG. 2 is a flow diagram showing a method for recognizing an external device by a portable terminal according to an exemplary embodiment of the present invention.

First, in step 200, the portable terminal 100 outputs a signal with a constant form (high level), regardless of the on/off state of the power source.

Then, the external device 200 is connected with the portable terminal 100 through a node of the external device 200 corresponding to the recognition node 144 of the portable terminal 100 in step 210, and determines if the external device 200 has recognized the portable terminal 100 according to a signal received from the recognition node 144 of the portable terminal 100 in step 220.

When the signal received from the recognition node 144 of the portable terminal 100 does not have a high level, the external device 200 fails to recognize the portable terminal 100, displays a state of being detached from the portable terminal 100, and re-determines if the external device 200 is connected with the portable terminal 100.

In contrast, when the signal received from the recognition node 144 of the portable terminal 100 has a high level, the external device 200 recognizes the portable terminal 100 and outputs a signal for a predetermined period of time in step 230.

Then, the portable terminal 100 converts the signal, which is input from the external device 200 through the recognition node 144 of the interface unit 140 for a predetermined period of time, into digital signals by the conversion unit 150 in step 240. Then, the portable terminal 100 identifies the number of the digital signals (rising edges/falling edges), and recognizes a corresponding external device 200 from a table stored in a memory in step 250. Also, the portable terminal 100 may identify the form of the converted digital signals in order to recognize a corresponding external device 200 from the table stored in the memory.

When the digital signals, which have been input from the external device 200 and have been converted by the conversion unit 150, include only one falling edge in step 260, the portable terminal 100 recognizes that the portable terminal 100 has been connected with an external battery in step 270. Also, the portable terminal 100 may recognize that the portable terminal 100 has been connected with the external battery when the digital signals, which have been input from the external device 200 and have been converted by the conversion unit 150, have a low level.

Then, the external battery is connected with the positive node 142 and ground node 146 of the portable terminal 100 through external battery's nodes corresponding to the nodes 142 and 146, and supplies charging power to the portable terminal 100 through the nodes, thereby performing the same function as a battery extension pack. Meanwhile, the portable terminal 100 identifies a voltage of the external battery, calculates a charged state and an expected available time of the battery, and then outputs the resultant data. In this case, the portable terminal 100 may output information about the charged state and expected available time by means of at least one of a voice message and a text message.

Also, when the portable terminal 100 recognizes a charging cradle which provides stereo sound, the operation of the portable terminal 100 is as follows. When digital signals, which have been input from the external device 200 and have been converted by the conversion unit 150, include one rising edge and one falling edge in step 280, the portable terminal 100 recognizes that the portable terminal 100 has been connected with a charging cradle by checking the table regarding types of the external device 200, stored in the memory 160, in step 290. In this case, the charging cradle converts the voice of a communication partner connected with the portable terminal 100 or data associated with various moving pictures, for example, of the portable terminal 100 into audio signals for reproduction, and then outputs the audio signals via a speaker.

According to the present invention as described above, it is possible for an external device to recognize a portable terminal regardless of the on/off state of the portable terminal. Moreover, it is possible for the portable terminal to recognize more various external devices, such as an external battery and a charging cradle which provides stereo sound, by using the recognition node of the portable terminal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The system and method for recognizing an external device by a portable terminal according to an exemplary embodiment of the present invention can be achieved as described above.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A system for recognizing an external device by a portable terminal, comprising:
   the external device outputting signals for a predetermined period of time when the external device recognizes a portable terminal; and
   the portable terminal recognizing the external device according to signals input from the external device during the predetermined period of time regardless of an on/off state of a power source to said portable terminal, wherein the external device recognizes the portable terminal according to the signals with a predetermined form, which have been output from the portable terminal and when the signals output from the portable terminal do not have the predetermined form, displaying a state of being detached from the portable terminal, and re-determining if the external device is connected with the portable terminal.

2. The system as claimed in claim 1, wherein the portable terminal comprises:
   a recognition node connected with the external device so as to recognize the external device; and
   an interface unit including a ground node and a positive node for supplying power to the portable terminal.

3. The system as claimed in claim 2, wherein the portable terminal comprises:
   a memory for storing a table regarding types of external devices corresponding to signals transferred through the recognition node from the external device; and
   a controller for identifying a number of the transferred signals, thereby recognizing a corresponding external device.

4. The system as claimed in claim 3, wherein, when the transferred signals include only a falling edge, the controller recognizes that the portable terminal has been connected with an external battery.

5. The system as claimed in claim 3, wherein, when the transferred signals include at least one of rising and falling edges, the controller reads the table stored in the memory, thereby recognizing that the portable terminal has been connected with a corresponding external device.

6. The system as claimed in claim 2, wherein the portable terminal comprises:
   a memory for storing a table regarding types of external devices corresponding to signals transferred through the recognition node from the external device; and
   a controller for identifying types of the transferred signals, thereby recognizing a corresponding external device.

7. The system as claimed in claim 6, wherein, when the transferred signals have a predetermined form, the controller recognizes that the portable terminal has been connected with an external battery.

8. The system as claimed in claim 6, wherein the external device includes at least one portable terminal accessory among a charging cradle which provides stereo sound, a digital camera, a portable printer, and a hands-free set.

9. A method for recognizing an external device by a portable terminal, the method comprising the steps of:

outputting, by the portable terminal, signals while maintaining the signals at a predetermined form, regardless of an on/off state of a power source to the portable terminal; and recognizing, by the portable terminal, after the portable terminal is recognized by the external device, a number or form of received signals for the predetermined period of time, and when the signals output from the portable terminal do not have the predetermined form, displaying a state of being detached from the portable terminal, an re-determining if the external device is connected with the portable terminal, wherein the portable terminal and the external device are connected through a portable terminal interface including a recognition node.

10. The method as claimed in claim 9, wherein in the step of recognizing, when the received signals include only a falling edge, recognizing that the portable terminal has been connected with an external battery.

11. The method as claimed in claim 9, wherein, in the step of recognizing: when the received signals include at least one of rising and falling edges, the portable terminal checks a table regarding types of external devices stored in a memory and recognizes that the portable terminal has been connected with a corresponding external device.

12. The method as claimed in claim 11, wherein the external device includes at least one portable terminal accessory among a charging cradle which provides stereo sound, a digital camera, a portable printer, and a hands-free set.

13. The method as claimed in claim 9, wherein, in the step of recognizing, when the received signals output have a predetermined form, the portable terminal recognizes that the portable terminal has been connected with an external battery.

* * * * *